(12) United States Patent
Kiik et al.

(10) Patent No.: US 10,995,495 B2
(45) Date of Patent: *May 4, 2021

(54) ROOFING MATERIAL

(71) Applicant: BUILDING MATERIALS INVESTMENT CORPORATION, Wilmington, DE (US)

(72) Inventors: Matti Kiik, Richardson, TX (US); Michael L. Bryson, Independence, MO (US); Paul G. Wilson, Waxahachie, TX (US); Margie A. Beerer, Ennis, TX (US); Olan Leitch, Bakersfield, CA (US)

(73) Assignee: BUILDING MATERIALS INVESTMENT CORPORATION, Wilmington, DE (US)

( * ) Notice: Subject to any disclaimer, the term of this patent is extended or adjusted under 35 U.S.C. 154(b) by 41 days.

This patent is subject to a terminal disclaimer.

(21) Appl. No.: 16/546,464

(22) Filed: Aug. 21, 2019

(65) Prior Publication Data

US 2019/0376290 A1 Dec. 12, 2019

Related U.S. Application Data

(63) Continuation of application No. 15/811,988, filed on Nov. 14, 2017, now Pat. No. 10,415,247, which is a
(Continued)

(51) Int. Cl.
*B32B 3/10* (2006.01)
*E04D 1/28* (2006.01)
(Continued)

(52) U.S. Cl.
CPC ............... *E04D 1/28* (2013.01); *B32B 5/022* (2013.01); *C09D 195/00* (2013.01); *E04D 1/12* (2013.01);
(Continued)

(58) Field of Classification Search
None
See application file for complete search history.

(56) References Cited

U.S. PATENT DOCUMENTS 2,113,644 A 4/1938 Bollaert
6,933,037 B2 8/2005 McCumber et al.
(Continued)

OTHER PUBLICATIONS

U.S. Appl. No. 14/606,666 (U.S. Pat. No. 9,845,602), filed Jan. 27, 2015, (Dec. 19, 2017).
(Continued)

*Primary Examiner* — Christopher M Polley
(74) *Attorney, Agent, or Firm* — Baker Botts L.L.P.

(57) ABSTRACT

A roofing material is provided having an asphalt-coated mat or felt made up of or in combinations of fiberglass, polyester, nylon, cotton, cellulosic fibers or materials, polyethylene, polypropylene, co-polymers, melamine, phenolic, acrylics, polycarbonate, carbon fiber, clay, metallic in woven, non-woven, strands or sheets, styrene compounds, rubber, silk, leather, or wool in a woven, non-woven, or solid form. The surfacing materials can be made up of or in combination minerals, plastic particles or film, metal particles or film, cement particles, clay particles, paints, coatings, glass, ceramics, wood, wood fiber, or composite materials.

20 Claims, 2 Drawing Sheets

Related U.S. Application Data continuation of application No. 14/606,666, filed on Jan. 27, 2015, now Pat. No. 9,845,602.

(60) Provisional application No. 61/931,828, filed on Jan. 27, 2014.

(51) Int. Cl.

| | | |
|---|---|---|
| *E04D 1/12* | (2006.01) | |
| *C09D 195/00* | (2006.01) | |
| *B32B 5/02* | (2006.01) | |
| *E04D 5/02* | (2006.01) | |
| *E04D 1/00* | (2006.01) | |
| *B32B 17/02* | (2006.01) | |

(52) U.S. Cl.
CPC ......... *B32B 17/02* (2013.01); *B32B 2262/101* (2013.01); *B32B 2419/06* (2013.01); *E04D 5/02* (2013.01); *E04D 2001/005* (2013.01); *Y10T 428/24802* (2015.01)

(56) References Cited

U.S. PATENT DOCUMENTS

| | | |
|---|---|---|
| 7,805,909 B2 | 10/2010 | Teng et al. |
| 7,833,339 B2 | 11/2010 | Whitaker et al. |
| 8,309,169 B2 | 11/2012 | Teng et al. |
| 8,663,418 B2 | 3/2014 | Kalkanoglu et al. |
| 2007/0218250 A1 | 9/2007 | Kiik et al. |
| 2008/0086970 A1 | 4/2008 | Teng et al. |
| 2011/0189433 A1 | 8/2011 | Kiik et al. |
| 2011/0223384 A1 | 9/2011 | Whitaker et al. |
| 2013/0095293 A1* | 4/2013 | Boss ................. B32B 11/10 428/147 |

OTHER PUBLICATIONS

U.S. Appl. No. 15/811,988 (U.S. Pat. No. 10,415,247), filed Nov. 14, 2017 (Sep. 17, 2019).
U.S. Appl. No. 15/811,988, Jul. 31, 2019 Issue Fee Payment.
U.S. Appl. No. 15/811,988, Jul. 25, 2019 Notice of Allowance.
U.S. Appl. No. 15/811,988, Jun. 25, 2019 Response to Non-Final Office Action.
U.S. Appl. No. 15/811,988, Apr. 17, 2019 Non-Final Office Action.
U.S. Appl. No. 14/606,666, Nov. 14, 2017 Issue Fee Payment.
U.S. Appl. No. 14/606,666, Aug. 14, 2017 Notice of Allowance.
U.S. Appl. No. 14/606,666, May 1, 2017 Response to Non-Final Office Action.
U.S. Appl. No. 14/606,666, Dec. 30, 2016 Non-Final Office Action.
U.S. Appl. No. 14/606,666, Nov. 28, 2016 Response to Restriction Requirement.
U.S. Appl. No. 14/606,666, Sep. 28, 2016 Restriction Requirement.
Acceptance Criteria for Alternative Asphalt Roofing Shingles, AC438, ICC Evaluation Service, pp. 1-5, Approved Oct. 2011.
Standard Specification for Asphalt Shingles Made from Glass Felt and Surfaced with Mineral Granules1, Designation D3462/D3462M—16, ASTM International, pp. 1-4 (Downloaded and printed on Nov. 11, 2016).

* cited by examiner

ROOFING MATERIAL

CROSS REFERENCE TO RELATED APPLICATIONS

This application is a continuation of U.S. patent application Ser. No. 15/811,988, filed Nov. 14, 2017, which is a continuation of U.S. patent application Ser. No. 14/606,666, filed on Jan. 27, 2015, now U.S. Pat. No. 9,845,602, which claims priority to U.S. Provisional Application No. 61/931,828, filed on Jan. 27, 2014, the contents of all of which are incorporated herein by reference in their entireties.

FIELD OF THE DISCLOSED SUBJECT MATTER

The disclosed subject matter relates to roofing material, including roofing shingles and roll roofing, having a novel construction.

BACKGROUND

Asphalt shingles and asphalt roll roofing for decades have been limited by building codes mandating compliance with certain industry specifications. For example, the ASTM D3462 specification, "Standard Specification for Asphalt Shingles made from Glass Felt and Surfaced with Mineral Granules," is one such industry standard for asphalt shingles and asphalt roll roofing.

The D3462 specification is quite limited, however, in the acceptable materials and construction parameters for producing roofing material. D3462 requires a fiberglass mat with a minimum weight, asphalt content, mineral surfacing, and mineral fillers mixed in the asphalt with a maximum percentage. For example, the exposed surface material and the headlap surface material must be composed of mineral granules, and the back surface covering material must be composed of a suitable material such as sand, talc, or mica. Additionally, the overall shingle under D3462 has a minimum shingle mass requirement. The entirety of the D3462 specification is hereby incorporated by reference. Flexibility in shingle design and manufacture has thus been somewhat limited.

Recently, however, the International Code Compliance Evaluation Service has approved an alternative shingle specification (ICC-ES AC438). The primary material requirement of ICC-ES AC438 is that shingles contain asphalt. AC438 focuses on shingle performance, rather than materials, and contains a number of shingle performance requirements, including those of the ASTM standards.

There is therefore a need for asphalt shingles constructed of alternative materials other than those required by the D3462 specification. The presently disclosed subject matter satisfies these and other needs.

SUMMARY

The purpose and advantages of the disclosed subject matter will be set forth in and are apparent from the description that follows, and will be learned by practice of the disclosed subject matter. Additional advantages of the disclosed subject matter will be realized and attained by the devices particularly pointed out in the written description and claims hereof, as well as from the appended drawings.

To achieve these and other advantages and in accordance with the purpose of the disclosed subject matter, as embodied and broadly described, the disclosed subject matter includes a roofing material using felts or mats of different compositions and alternatives to mineral surfacing materials. This roofing material meets the ICC-ES AC438 standard, including the physical and performance requirements. The disclosed roofing material can be made from lighter-weight and lower-cost materials, and will perform as well or better than existing shingles and roll roofing.

In accordance with another aspect of the disclosed subject matter, a roofing material is provided comprising a mat, comprising top and back surfaces, at least one asphalt layer, disposed on the mat, comprising asphalt and an asphalt filler, an exposed surface covering material disposed on an exposed area of the top surface, and a headlap surface covering material disposed on a headlap area of the top surface, wherein the roofing material satisfies the performance requirements of the AC438 standard, including, wind resistance, fire rating, weather resistance, temperature cycling, wind-driven rain resistance, and breaking strength after weathering.

In further embodiments of the disclosed subject matter, the roofing material mat comprises one or more of fiberglass, polyester, nylon, cotton, cellulosic fibers or materials, polyethylene, polypropylene, co-polymers, melamine, phenolic, acrylics, polycarbonate, carbon fiber, clay, metallic in woven, non-woven, strands or sheets, styrene compounds, rubber, silk, leather, and wool in a woven, non-woven, or solid form.

In further embodiments of the disclosed subject matter, the roofing material exposed surface covering material comprises one or more of minerals, plastic particles or film, metal particles or film, cement particles, clay particles, paints, coatings, glass, ceramics, wood, wood fiber, and composite materials.

In further embodiments of the disclosed subject matter, the roofing material headlap surface covering material comprises one or more of minerals, plastic particles or film, metal particles or film, cement particles, clay particles, paints, coatings, glass, ceramics, wood, wood fiber, and composite materials.

In further embodiments of the disclosed subject matter, the roofing material back surface covering material comprises one or more of sand, coal slag, and polymer film.

It is to be understood that the foregoing general description and the following detailed description and drawings are only examples and are provided for purpose of illustration and not intended to limit the scope of the disclosed subject matter in any way.

The accompanying drawings, which are incorporated in and constitute part of this specification, are included to illustrate and provide a further understanding of the devices of the disclosed subject matter. Together with the description, the drawings serve to explain the principles of the disclosed subject matter.

BRIEF DESCRIPTION OF THE DRAWINGS

The subject matter of the application will be more readily understood from the following detailed description when read in conjunction with the accompanying drawings, in which.

DETAILED DESCRIPTION

Figure 1:
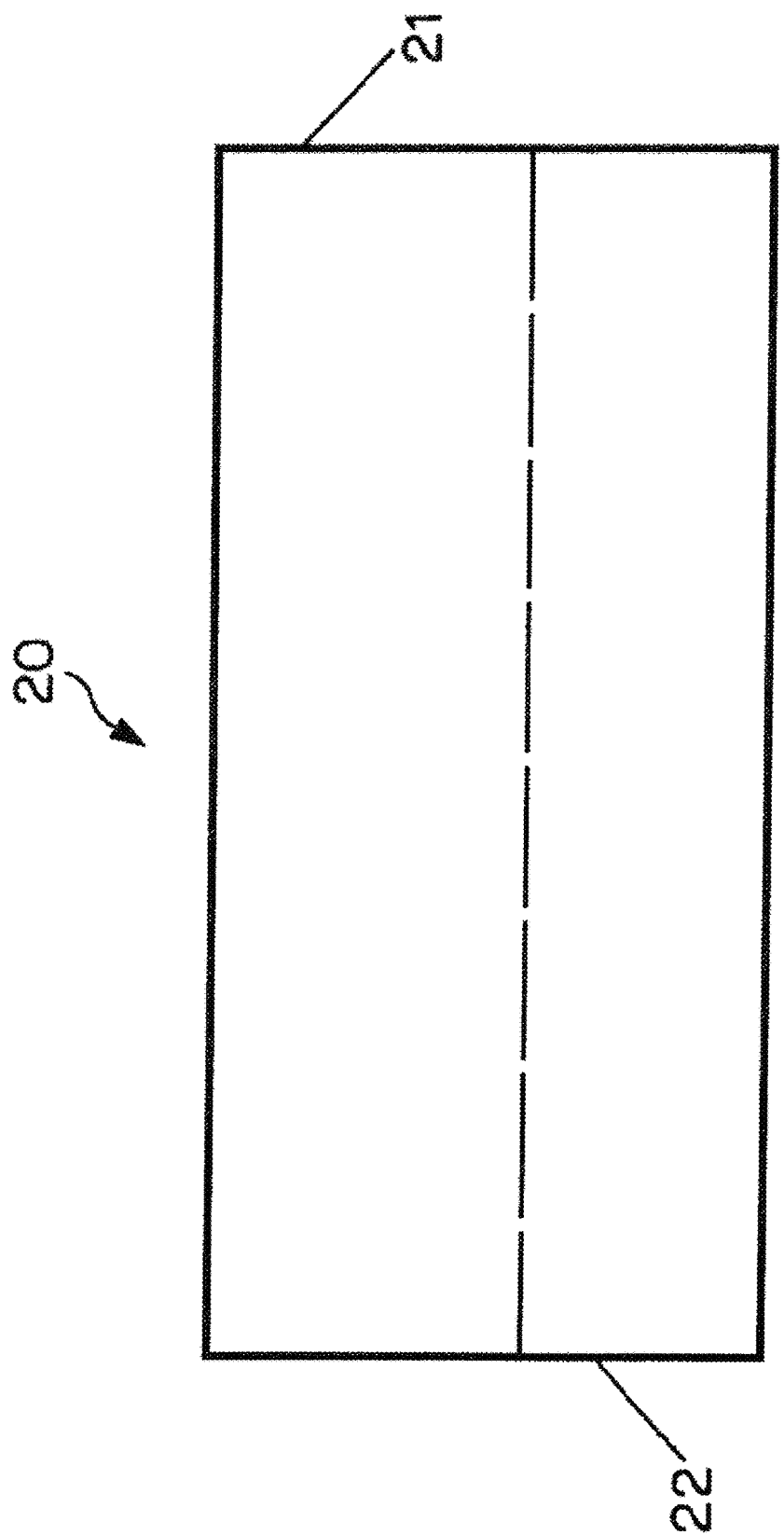
FIG. 1 is a perspective view of a roofing material in accordance with the present disclosure.

Reference will now be made in detail to embodiments of the disclosed subject matter, an example of which is illustrated in the accompanying drawings. The disclosed subject matter will be described in conjunction with the detailed description of the system.

In accordance with the disclosed subject matter, the use of different felts to make an asphalt shingle can be made up of or in combinations of: fiberglass, polyester, nylon, cotton, cellulosic fibers or materials, polyethylene, polypropylene, co-polymers, melamine, phenolic, acrylics, polycarbonate, carbon fiber, clay, metallic in woven, non-woven, strands or sheets, styrene compounds, rubber, silk, leather, or wool in a woven, non-woven, or solid form. The surfacing materials can be made up of or in combination minerals, plastic particles or film, metal particles or film, cement particles, clay particles, paints, coatings, glass, ceramics, wood, wood fiber, or composite materials.

The various embodiments of the disclosed subject matter, described in detail below, are constructed with one common raw material, asphalt. Other materials, however, can vary. For example, the felt that is the base of an asphalt shingle can be a polypropylene woven material coated on the top and back surface with an asphaltic compound containing finely ground mineral stabilizer. The back of the shingle can be coated with a crushed waste cement product that keeps the shingles from sticking together in the bundle before being applied to the roof. On the top portion of the single the exposure area of the shingle can be covered with a colored crushed brick material and the non-exposure area of the shingle can be covered with a mineral surfacing material such as limestone.

In further embodiments of the disclosed subject matter, the felt can be a fiberglass non-woven mat coated on both the top and bottom surface with the filled asphalt coating. The back surface and the non-exposure area of the top of the shingles can be covered with a crushed expanded clay material. The exposed portion of the shingle can be covered with a ceramic coated aluminum flake material.

In further embodiments of the disclosed subject matter the felt can be made with a combination of fiberglass and aluminum strands and can be coated on both top and back surfaces with a filled asphalt coating. The back surface may be covered with a mineral surfacing material. The top of the shingle's exposed surface may be coated with a reduced size colored ceramic coated mineral surfacing granule mixed with a antimicrobial polypropylene granule. The non-exposed portion of the top side of the shingle may be covered with a mineral surfacing material.

In further embodiments of the disclosed subject matter the felt can be made with a fiberglass and can be coated on both top and back surfaces with a filled asphalt coating. The back side of the felt can be covered with a polyethylene film. The top surface can be coated with a filled asphalt coating. In some embodiments, the back surface covering material can be omitted. The top of the shingle's surface can be covered with a crushed waste concrete and the exposure can be painted.

Solely for the purpose of illustration, FIG. 1 depicts an embodiment of a roofing shingle in accordance with the present disclosure. Particularly, and as illustrated, the roofing shingle 20 can comprise a headlap section 21 and a buttlap (or exposed) section 22. The headlap section 21 is the portion of the shingle that is covered by an overlaid shingle after installation. The buttlap section is the portion of the shingle that is exposed after installation. In FIG. 1, the dashed line indicates the demarcation between these two sections.

Figure 2:
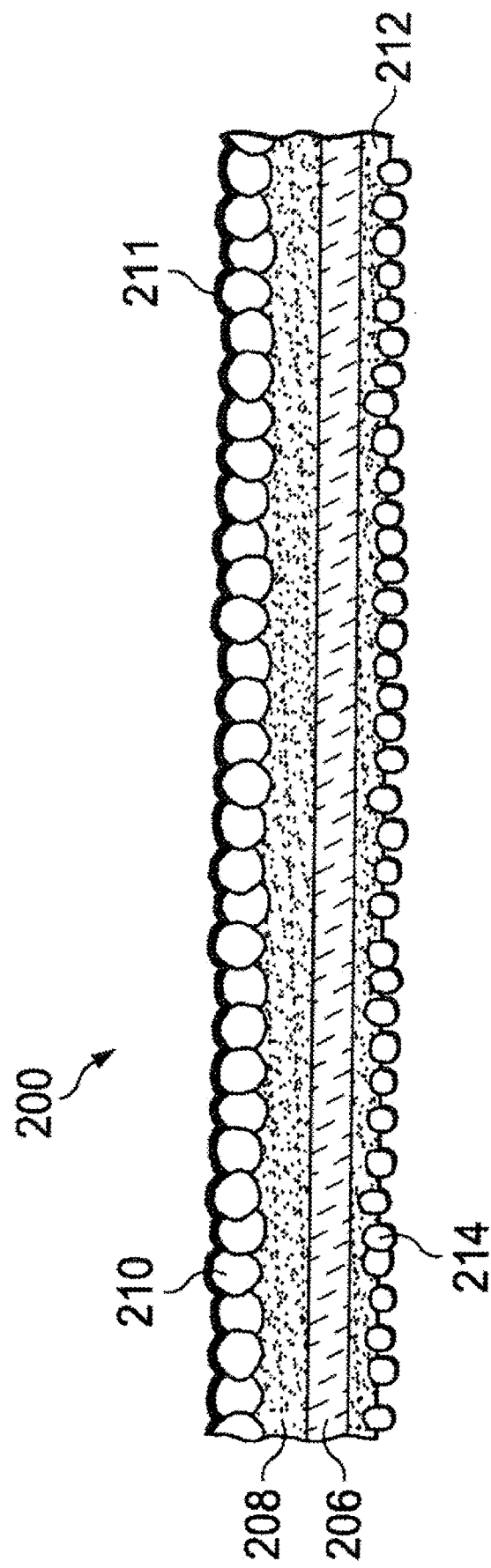
FIG. 2 is a cross-sectional view of a roofing material in accordance with the present disclosure.

FIG. 2 depicts an embodiment of a roofing material 200 in accordance with the present disclosure. The roofing material 200 can comprise a mat or felt 206, an asphalt filled coating 208, which can be disposed on top of the mat 206, a second asphalt filled coating 212, which can be disposed beneath the mat 206. A layer of top surface material 210 can be disposed over the first asphalt filled coating 208. A layer of back surface material 214 can be disposed over the second asphalt filled coating 212. The top surface layer 210 can be subdivided into headlap and buttlap sections as depicted in FIG. 1. The headlap and buttlap sections of the top surface layer 210 can be comprised of the same or different materials, as described in more detail below. Optionally, a layer of color coating 211 (e.g., paint) can be disposed on top of the top surface layer 210.

The examples herein are not intended to limit the scope of the disclosed subject matter. It will be understood that the configuration depicted in FIG. 1, known as a "no cut-out" or strip shingle, is just one of many well-known asphalt-based roofing products, such as three-tab shingles, laminated or architectural shingles, hip and ridge shingles, and roll roofing. These and other such products are all compatible with the disclosed subject matter. Similarly, the configuration depicted in FIG. 2 is an exemplary layout, but not intended to be limiting or exhaustive. A variety of well-known roofing material configurations can be used with the disclosed subject matter.

Although some of the materials described herein are previously known for use in shingles, such as in the D3462 specification, the combinations as described herein are unique and offer improvements over known combinations. For example, many of the materials used in embodiments of the disclosed subject matter are lower-cost and/or lighter-weight than existing materials, and therefore offer previously unrealized advantages such as lower costs of production and shipping, improved ease of manufacture and installation and/or improved performance.

Example Shingles

Specific exemplary embodiments of the disclosed subject matter are provided in the tables below. The data provided in these tables are based on construction of a 36 inch by 12 inch no cut-out shingle with a 5-inch exposure, such as depicted in FIG. 1. A "square" containing 80 shingles is made up of 240 square feet of shingles and covers 100 square feet of roof at the recommended exposure. The term "wt./100 sq. ft." represents the weight of the material per 100 square feet of shingle. The term "Wt./Sq." represents the weight of the material per square. As a benchmark, an exemplary prior-art shingle constructed according to the D3462 specification is also provided.

Although the examples are provided for a no cut-out shingle for simplicity, the scope of the invention is not limited to any specific shingle configuration or other roof covering product. Moreover, the values given below are not intended to be limiting or exclusive. A person of ordinary skill in the art would understand that weights and compositions of certain materials can be varied or adjusted without a substantial change in shingle performance or quality.

TABLE 1

Prior Art Shingle (D3462)

| Mat (felt) | |
| --- | --- |
| Material | non-woven fiberglass |
| wt./100 sq. ft. | 1.35 lbs. (min.) |

TABLE 1-continued

Prior Art Shingle (D3462)

| | |
|---|---|
| Wt./Sq. | 3.24 lbs. |
| Asphalt | |
| wt./100 sq. ft. | 15.00 lbs. (min.) |
| Wt./Sq. | 36.00 lbs. |
| Asphalt Filler | |
| Material | limestone |
| Filler Percentage | 70% (max.) |
| Wt./Sq. | 84.00 lbs. |
| Exposed Surface Covering Material | |
| Material | grade 11 mineral granules |
| wt./100 sq. ft. | 25.00 lbs. (min.) |
| Wt./Sq. | 25.00 lbs. |
| Headlap surface covering material | |
| Material | grade 11 mineral granules |
| wt./100 sq. ft. | 25.00 lbs. (min.) |
| Wt./Sq. | 35.00 lbs. |
| Back Surface covering material | |
| Material | sand |
| wt./100 sq. ft. | no requirement |
| Wt./Sq. | 12.00 lbs. |
| Total lbs./Sq. | 195.24 lbs. |

TABLE 2

Example 1

| | |
|---|---|
| Mat (felt) | |
| Material | non-woven fiberglass |
| wt./100 sq. ft. | 1.55 lbs. |
| Wt./Sq. | 3.72 lbs. |
| Asphalt | |
| wt./100 sq. ft. | 10.50 lbs. |
| Wt./Sq. | 25.20 lbs. |
| Asphalt Filler | |
| Material | limestone |
| Filler Percentage | 65% |
| Wt./Sq. | 46.80 lbs. |
| Exposed Surface Covering Material | |
| Material | grade 18 mineral granules |
| wt./100 sq. ft. | 18.00 lbs. |
| Wt./Sq. | 18.00 lbs. |
| Headlap surface covering material | |
| Material | grade 18 mineral granules |
| wt./100 sq. ft. | 18.00 lbs. |
| Wt./Sq. | 25.20 lbs. |
| Back Surface covering material | |
| Material | sand |
| wt./100 sq. ft. | no requirement |
| Wt./Sq. | 12.00 lbs. |
| Total lbs./Sq. | 130.92 lbs. |

TABLE 3

Example 2

| | |
|---|---|
| Mat (felt) | |
| Material | spunglass polypropylene |
| wt./100 sq. ft. | 1.00 lbs. |
| Wt./Sq. | 2.40 lbs. |
| Asphalt | |
| wt./100 sq. ft. | 10.50 lbs. |
| Wt./Sq. | 25.20 lbs. |
| Asphalt Filler | |
| Material | limestone |
| Filler Percentage | 65% |
| Wt./Sq. | 46.80 lbs. |
| Exposed Surface Covering Material | |
| Material | grade 18 mineral granules |
| wt./100 sq. ft. | 18.00 lbs. |
| Wt./Sq. | 18.00 lbs. |
| Headlap surface covering material | |
| Material | grade 18 mineral granules |
| wt./100 sq. ft. | 18.00 lbs. |
| Wt./Sq. | 25.20 lbs. |
| Back Surface covering material | |
| Material | sand |
| wt./100 sq. ft. | no requirement |
| Wt./Sq. | 12.00 lbs. |
| Total lbs./Sq. | 129.60 lbs. |

TABLE 4

Example 3

| | |
|---|---|
| Mat (felt) | |
| Material | non-woven fiberglass |
| wt./100 sq. ft. | 1.55 lbs. |
| Wt./Sq. | 3.72 lbs. |
| Asphalt | |
| wt./100 sq. ft. | 10.50 lbs. |
| Wt./Sq. | 25.20 lbs. |
| Asphalt Filler | |
| Material | limestone |
| Filler Percentage | 65% |
| Wt./Sq. | 46.80 lbs. |
| Exposed Surface Covering Material | |
| Material | aluminum flakes |
| wt./100 sq. ft. | 3.00 lbs. |
| Wt./Sq. | 3.00 lbs. |
| Headlap surface covering material | |
| Material | fine mineral surfacing |
| wt./100 sq. ft. | 12.00 lbs. |
| Wt./Sq. | 16.80 lbs. |
| Back Surface covering material | |
| Material | fine coal slag |
| wt./100 sq. ft. | no requirement |
| Wt./Sq. | 8.00 lbs. |
| Total lbs./Sq. | 103.52 lbs. |

TABLE 5

Example 4

Mat (felt)

| | |
|---|---|
| Material | non-woven fiberglass |
| wt./100 sq. ft. | 1.55 lbs. |
| Wt./Sq. | 3.72 lbs. |

Asphalt

| | |
|---|---|
| wt./100 sq. ft. | 15.00 lbs. |
| Wt./Sq. | 36.00 lbs. |

Asphalt Filler

| | |
|---|---|
| Material | limestone |
| Filler Percentage | 65% |
| Wt./Sq. | 66.86 lbs. |

Exposed Surface Covering Material

| | |
|---|---|
| Material | plastic granules |
| wt./100 sq. ft. | 10.00 lbs. |
| Wt./Sq. | 10.00 lbs. |

Headlap surface covering material

| | |
|---|---|
| Material | plastic granules |
| wt./100 sq. ft. | 10.00 lbs. |
| Wt./Sq. | 14.00 lbs. |

Back Surface covering material

| | |
|---|---|
| Material | sand |
| wt./100 sq. ft. | no requirement |
| Wt./Sq. | 12.00 lbs. |
| | |
| Total lbs./Sq. | 142.58 lbs. |

TABLE 6

Example 5

Mat (felt)

| | |
|---|---|
| Material | non-woven fiberglass |
| wt./100 sq. ft. | 1.55 lbs. |
| Wt./Sq. | 3.72 lbs. |

Asphalt

| | |
|---|---|
| wt./100 sq. ft. | 15.00 lbs. |
| Wt./Sq. | 36.00 lbs. |

Asphalt Filler

| | |
|---|---|
| Material | limestone |
| Filler Percentage | 65% |
| Wt./Sq. | 66.86 lbs. |

Exposed Surface Covering Material

| | |
|---|---|
| Material | plastic & mineral granule blend |
| wt./100 sq. ft. | 20.00 lbs. |
| Wt./Sq. | 20.00 lbs. |

Headlap surface covering material

| | |
|---|---|
| Material | plastic & mineral granule blend |
| wt./100 sq. ft. | 20.00 lbs. |
| Wt./Sq. | 28.00 lbs. |

Back Surface covering material

| | |
|---|---|
| Material | sand |
| wt./100 sq. ft. | no requirement |
| Wt./Sq. | 12.00 lbs. |
| | |
| Total lbs./Sq. | 166.58 lbs. |

TABLE 7

Example 6

Mat (felt)

| | |
|---|---|
| Material | non-woven polyester |
| wt./100 sq. ft. | 1.05 lbs. |
| Wt./Sq. | 2.52 lbs. |

Asphalt

| | |
|---|---|
| wt./100 sq. ft. | 10.50 lbs. |
| Wt./Sq. | 25.20 lbs. |

Asphalt Filler

| | |
|---|---|
| Material | limestone |
| Filler Percentage | 65% |
| Wt./Sq. | 46.80 lbs. |

Exposed Surface Covering Material

| | |
|---|---|
| Material | grade 18 mineral granules |
| wt./100 sq. ft. | 18.00 lbs. |
| Wt./Sq. | 18.00 lbs. |

Headlap surface covering material

| | |
|---|---|
| Material | expanded clay granules |
| wt./100 sq. ft. | 12.00 lbs. |
| Wt./Sq. | 16.80 lbs. |

Back Surface covering material

| | |
|---|---|
| Material | fine coal slag |
| wt./100 sq. ft. | no requirement |
| Wt./Sq. | 8.00 lbs. |
| | |
| Total lbs./Sq. | 117.32 lbs. |

TABLE 8

Example 7

Mat (felt)

| | |
|---|---|
| Material | non-woven fiberglass |
| wt./100 sq. ft. | 1.55 lbs. |
| Wt./Sq. | 3.72 lbs. |

Asphalt

| | |
|---|---|
| wt./100 sq. ft. | 12.00 lbs. |
| Wt./Sq. | 28.80 lbs. |

Asphalt Filler

| | |
|---|---|
| Material | limestone |
| Filler Percentage | 65% |
| Wt./Sq. | 53.50 lbs. |

Exposed Surface Covering Material

| | |
|---|---|
| Material | grade 11 mineral granules |
| wt./100 sq. ft. | 25.00 lbs. |
| Wt./Sq. | 25.00 lbs. |

Headlap surface covering material

| | |
|---|---|
| Material | grade 11 mineral granules |
| wt./100 sq. ft. | 25.00 lbs. (min.) |
| Wt./Sq. | 35.00 lbs. |

Back Surface covering material

| | |
|---|---|
| Material | sand |
| wt./100 sq. ft. | no requirement |
| Wt./Sq. | 12.00 lbs. |
| | |
| Total lbs./Sq. | 158.02 lbs. |

TABLE 9

| Example 8 | |
|---|---|
| Mat (felt) | |
| Material | mineral & acrylic coated fiberglass mat, one side |
| wt./100 sq. ft. | 12.00 lbs. |
| Wt./Sq. | 28.80 lbs. |
| Asphalt | |
| wt./100 sq. ft. | 9.00 lbs. |
| Wt./Sq. | 21.60 lbs. |
| Asphalt Filler | |
| Material | limestone |
| Filler Percentage | 65% |
| Wt./Sq. | 40.11 lbs. |
| Exposed Surface Covering Material | |
| Material | grade 11 mineral granules |
| wt./100 sq. ft. | 25.00 lbs. |
| Wt./Sq. | 25.00 lbs. |
| Headlap surface covering material | |
| Material | grade 11 mineral granules |
| wt./100 sq. ft. | 25.00 lbs. (min.) |
| Wt./Sq. | 35.00 lbs. |
| Back Surface covering material | |
| Material | n/a |
| wt./100 sq. ft. | no requirement |
| Wt./Sq. | 0.00 lbs. |
| Total lbs./Sq. | 150.51 lbs. |

TABLE 10

| Example 9 | |
|---|---|
| Mat (felt) | |
| Material | non-woven fiberglass |
| wt./100 sq. ft. | 1.55 lbs. |
| Wt./Sq. | 3.72 lbs. |
| Asphalt | |
| wt./100 sq. ft. | 10.50 lbs. |
| Wt./Sq. | 25.20 lbs. |
| Asphalt Filler | |
| Material | limestone |
| Filler Percentage | 65% |
| Wt./Sq. | 46.80 lbs. |
| Exposed Surface Covering Material | |
| Material | aluminum flakes |
| wt./100 sq. ft. | 3.00 lbs. |
| Wt./Sq. | 3.00 lbs. |
| Headlap surface covering material | |
| Material | polymer film |
| wt./100 sq. ft. | 1.50 lbs. |
| Wt./Sq. | 2.10 lbs. |
| Back Surface covering material | |
| Material | polymer film |
| wt./100 sq. ft. | 1.50 lbs. |
| Wt./Sq. | 3.60 lbs. |
| Total lbs./Sq. | 84.42 lbs. |

TABLE 11

| Example 10 | |
|---|---|
| Mat (felt) | |
| Material | non-woven fiberglass |
| wt./100 sq. ft. | 1.55 lbs. |
| Wt./Sq. | 3.72 lbs. |
| Asphalt | |
| wt./100 sq. ft. | 7.50 lbs. |
| Wt./Sq. | 18.00 lbs. |
| Asphalt Filler | |
| Material | limestone |
| Filler Percentage | 60% |
| Wt./Sq. | 27.00 lbs. |
| Exposed Surface Covering Material | |
| Material | textured & painted polymer film |
| wt./100 sq. ft. | 3.50 lbs. |
| Wt./Sq. | 3.50 lbs. |
| Headlap surface covering material | |
| Material | polymer film |
| wt./100 sq. ft. | 1.50 lbs. |
| Wt./Sq. | 2.10 lbs. |
| Back Surface covering material | |
| Material | polymer film |
| wt./100 sq. ft. | 1.50 lbs. |
| Wt./Sq. | 3.60 lbs. |
| Total lbs./Sq. | 57.92 lbs. |

All of the above examples have a lighter total weight than the prior art D3462 shingle (57.92 to 166.85 pounds per square compared to 195.24). This is a result of the lighter-weight materials used in their construction.

Furthermore, roofing material of the disclosed subject matter conform to the AC438 standard, which includes some of the physical requirements of the D3462 specification such as dimensions and pliability, but replaces several of the D3462's physical requirements with performance requirements. The performance requirements of the AC438 standard include, for example: wind resistance, which are a minimum of either ASTM D 7158 Class D or, alternatively, ASTM D 3161 Class A; fire rating of at least ASTM E 108 or UL790, Class C; weather resistance, after testing of which, according to ASTM G 155, the weathered specimens show no visual signs of surfacing material loss, cracks, erosion or exposed felt substrate; temperature cycling, after testing of which the specimens do not show signs of tearing or cracking of the filled asphalt coating that exposes the reinforcing felt of the shingle, or separation greater than ¼ inch (6.4 mm) at the joints between the specimens, and there are no signs of tearing of the shingle at the fastener locations or pull-through of the fasteners, and no portion of the asphalt-coated reinforcing felt breaks or separates from the specimens; wind-driven rain resistance, which is tested according to Florida Building Code Test Protocol TAS-100, after which any test specimen which exhibits water infiltration through the sheathing is considered as failing the wind-driven rain test, and any test specimen which has the prepared roof covering or any portion thereof "blow off," tear or blow upward without reseating during the test is considered as failing the wind driven rain test; and breaking strength after weathering, according to which the average breaking strength of weathered specimens is not less than 80 percent of the average breaking strength of unweathered specimens. A more detailed description of the AC438 requirements are found in the AC438 specification, which is hereby incorporated by reference in its entirety.

While the disclosed subject matter is described herein in terms of certain preferred and exemplary embodiments, those skilled in the art will recognize that various modifications and improvements can be made to the disclosed subject matter without departing from the scope thereof. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

In addition to the various embodiments depicted and claimed, the disclosed subject matter is also directed to other embodiments having other possible combinations of the features disclosed and claimed herein. As such, the particular features presented herein can be combined with each other in other manners within the scope of the disclosed subject matter such that the disclosed subject matter includes any suitable combination of the features disclosed herein. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the system and method of the disclosed subject matter without departing from the spirit or scope of the disclosed subject matter. Thus, it is intended that the disclosed subject matter include modifications and variations that are within the scope of the appended claims and their equivalents.

What is claimed is:

1. A roofing material, comprising:
a mat, comprising top and back surfaces, the top surface comprising an exposed surface and a headlap surface;
at least one asphalt layer, disposed on the mat, comprising asphalt and an asphalt filler;
an exposed surface covering material disposed on the exposed surface; and
a headlap surface covering material disposed on the headlap surface,
wherein the roofing material has a total mass that is less than 150.51 pounds per square which is less than the minimum mass requirements of the D3462 standard.

2. The roofing material of claim 1, wherein the roofing material is an asphalt shingle.

3. The roofing material of claim 1, wherein the roofing material is roll roofing.

4. The roofing material of claim 1, wherein the roofing material is at least one of a strip shingle, a three-tab shingle, a laminated shingle, an architectural shingle, or a hip and ridge shingle.

5. The roofing material of claim 1, wherein the mat comprises one or more of fiberglass, polyester, nylon, cotton, cellulosic fibers or materials, polyethylene, polypropylene, co-polymers, melamine, phenolic, acrylics, polycarbonate, carbon fiber, clay, metallic in woven, non-woven, strands or sheets, styrene compounds, rubber, silk, leather, or wool in a woven, non-woven, or solid form.

6. The roofing material of claim 5, wherein the mat comprises fiberglass.

7. The roofing material of claim 1, wherein the wt./100 sq. ft. of the asphalt is less than 15.00 lbs.

8. The roofing material of claim 7, wherein the wt./100 sq. ft. of the asphalt is 9.00 lbs. or less.

9. The roofing material of claim 1, wherein the exposed surface covering material comprises one or more of minerals, plastic particles or film, metal particles or film, cement particles, clay particles, paints, coatings, glass, ceramics, wood, wood fiber, or composite materials.

10. The roofing material of claim 9, wherein the exposed surface covering material comprises minerals grade 18.

11. The roofing material of claim 1, wherein the wt./100 sq. ft. of the exposed surface covering material is less than 25.00 lbs.

12. The roofing material of claim 11, wherein the wt./100 sq. ft. of the exposed surface covering material is 10.00 lbs. or less.

13. The roofing material of claim 1, wherein the headlap surface covering material comprises one or more of minerals, plastic particles or film, metal particles or film, cement particles, clay particles, paints, coatings, glass, ceramics, wood, wood fiber, or composite materials.

14. The roofing material of claim 13, wherein the headlap surface covering material comprises minerals grade 18.

15. The roofing material of claim 1, wherein the wt./100 sq. ft. of the headlap surface covering material is less than 25.00 lbs.

16. The roofing material of claim 15, wherein the wt./100 sq. ft. of the headlap surface covering material is 12.00 lbs. or less.

17. The roofing material of claim 1, wherein the roofing material further comprises a back surface covering material disposed on the back surface, wherein the back surface covering material comprises one or more of sand, coal slag, polymer film, minerals, plastic particles or film, metal particles or film, cement particles, clay particles, paints, coatings, glass, ceramics, wood, wood fiber, and/or composite materials.

18. The roofing material of claim 17, wherein the back surface covering material comprises sand.

19. The roofing material of claim 1, further comprising a color coating disposed on top of the top surface.

20. The roofing material of claim 1, wherein the fire rating of the roofing material is Class A when tested according to at least one of ASTM E 108 or UL790.

* * * * *